US012331584B2

(12) United States Patent
Sommer et al.

(10) Patent No.: US 12,331,584 B2
(45) Date of Patent: Jun. 17, 2025

(54) CLIMATE STRESS COMPENSATING SPACER

(71) Applicant: TECHNOFORM GLASS INSULATION HOLDING GMBH, Lohfelden (DE)

(72) Inventors: Petra Sommer, Lohfelden (DE); Matteo Dolcera, Lohfelden (DE); Jörg Lenz, Lohfelden (DE)

(73) Assignee: TECHNOFORM GLASS INSULATION HOLDING GMBH, Lohfelden (DE)

( * ) Notice: Subject to any disclaimer, the term of this patent is extended or adjusted under 35 U.S.C. 154(b) by 1082 days.

(21) Appl. No.: 17/286,646

(22) PCT Filed: Oct. 18, 2019

(86) PCT No.: PCT/EP2019/078382
§ 371 (c)(1),
(2) Date: Apr. 19, 2021

(87) PCT Pub. No.: WO2020/083777
PCT Pub. Date: Apr. 30, 2020

(65) Prior Publication Data

US 2021/0372195 A1 Dec. 2, 2021

(30) Foreign Application Priority Data

Oct. 22, 2018 (EP) ..................................... 18201734

(51) Int. Cl.
*E06B 3/663* (2006.01)

(52) U.S. Cl.
CPC ...... *E06B 3/66319* (2013.01); *E06B 3/66361* (2013.01)

(58) Field of Classification Search
CPC ............. E06B 3/66319; E06B 3/66361; E06B 3/66314; E06B 2003/6638; E06B 2003/66385
See application file for complete search history.

(56) References Cited

U.S. PATENT DOCUMENTS 6,823,644 B1 11/2004 Peterson
2006/0037262 A1 2/2006 Siebert et al.
(Continued)

FOREIGN PATENT DOCUMENTS

DE 102006047034 A1 4/2007
EP 1099038 B1 4/2004
(Continued)

OTHER PUBLICATIONS

Communication from the European Patent Office in related application No. EP 19789682.2 dispatched Oct. 15, 2020.
(Continued)

*Primary Examiner* — Laura A Auer
(74) *Attorney, Agent, or Firm* — J-TEK LAW PLLC; Jeffrey D. Tekanic; Scott T. Wakeman

(57) ABSTRACT

A spacer is provided for an insulating glazing unit that includes at least two spaced-apart glazing panes connected along their edges via the spacer in a mounted state in which the spacer is mounted at the edges to limit an interspace, which is defined between the glazing planes and is filled with gas. The spacer has an inner wall (14) connecting side walls (11, 12) on an inner side that faces the interspace. The inner wall (14) includes a recess portion (14*rs*, 14*rt*, 14*rc*) that enables the length of the inner wall to change in the width direction in response to an external pressure force or an external tensional force applied to the side walls (11, 12).

20 Claims, 7 Drawing Sheets

(56) References Cited

U.S. PATENT DOCUMENTS

| | | | |
|---|---|---|---|
| 2006/0201105 | A1 | 9/2006 | Kato et al. |
| 2007/0077376 | A1 | 4/2007 | Mamiya et al. |

FOREIGN PATENT DOCUMENTS

| | | | |
|---|---|---|---|
| EP | 2679758 | A1 | 1/2014 |
| WO | 0005475 | A1 | 2/2000 |
| WO | 2004005783 | A2 | 1/2004 |
| WO | 2004038155 | A1 | 5/2004 |
| WO | 2014063801 | A1 | 5/2014 |

OTHER PUBLICATIONS

Extended European Search Report for priority application No. EP 18201734.3 dispatched Mar. 29, 2019, including examined claims 1-16.

International Search Report and Written Opinion of the International Searching Authority in PCT/EP2019/078382 dispatched Nov. 22, 2019.

PRIOR ART

PRIOR ART

CLIMATE STRESS COMPENSATING SPACER

CROSS-REFERENCE TO RELATED APPLICATIONS

This application is the U.S. National Stage of International Application No. PCT/EP2019/078382 filed on Oct. 18, 2019, which claims priority to European patent application no. 18 201 734.3 filed on Oct. 22, 2018.

TECHNICAL FIELD

The present invention generally relates to a spacer for insulating glass units, which may be suitable for compensating climate stress in insulating glass units.

BACKGROUND OF THE INVENTION

Heating and cooling of an insulting glazing unit (hereinafter, "IGU") may be caused by usual climate (temperature) changes in winter and summer, the weather, the change of day to night and vice versa, and/or air conditioning and heating. Heating and cooling or wind pressure may cause climate stress in the form of significant pressure differences between the gas volume inside the IGU and the outside atmosphere, which results in bending or curvatures of the glazing panes of the IGU. This results in high stress on the edge bond of the IGU, which leads to escaping (leakage) of internal gas and/or to ingress of water. Both significantly reduce the performance of the IGU. In case of climate loads, the secondary sealant needs to act as a spring and a damper. The stiffer the spacer is, the more the secondary sealant needs to compensate. Otherwise the stress on a primary sealant becomes too high.

U.S. Pat. No. 6,823,644 and US 2006/201105 A1 disclose a spacer design for compensating climate stress at the spacer in an insulating glass unit (IGU), in which sections of the inner wall facing the interspace between glazing panes of the IGU, are separated and movable relative to each other. US 2007/0077376 A1 also discloses such a spacer design as prior art and additional spacer designs in which at least one lateral side wall adapted to face a glazing pane is separated from an adjacent separate side wall of a chamber for accommodating desiccant.

WO 2004/038155 A1 discloses a spacer design with a curved wall design for compensating climate stress at the spacer in an insulating glass unit (IGU). WO 2014/063801 A1 discloses a spacer design with a curved wall design.

WO 2004/05783 A2 discloses muntin bar designs for compensating climate stress at the muntin bars in an insulating glass unit (IGU).

EP 2 679 758 A1 discloses (in FIGS. 5 to 12 thereof) spacer designs for allowing relative movements of glazing panes towards and away from each other and movements parallel to each other.

SUMMARY OF THE INVENTION

It is one non-limiting object of the present teachings to disclose techniques for improving a spacer design for compensating climate stress in an insulating glass unit (IGU).

In one non-limiting aspect of the present teachings, a spacer is disclosed for use in manufacturing an insulating glazing unit, in which edges of at least two spaced-apart glazing panes are connected via the spacer in a mounted state in which the spacer is mounted along the edges to limit an interspace filled with gas. The spacer extends with an essentially constant cross-section (x-y) in a longitudinal direction (z)

The spacer may comprise, e.g., a plastic body extending in the longitudinal direction (z) and having two lateral side walls and an inner wall located on an inner side of the spacer and configured to face the interspace when the spacer is mounted between the glazing panes. A gas-diffusion barrier film may be formed on the outer side of the spacer which faces away from the interspace when the spacer is mounted between the glazing panes.

The lateral side walls are configured to respectively face the glazing panes in a width direction (x) that is perpendicular to the longitudinal direction (z) when the spacer is mounted between the glazing panes. In addition, the lateral side walls extend, in the cross section (x-y), in a height direction (y) that is perpendicular to the longitudinal direction (z) and the width direction (x), towards the inner side up to respective inner ends of the lateral side walls. Lateral outer sides at the inner ends of the lateral side walls are separated by a predetermined distance (w1) in a state in which no external pressure force or no external tensional force is applied to the lateral side walls. The inner wall connects the lateral side walls on the inner side of the spacer.

A chamber configured to accommodate desiccating material optionally may be defined, in a cross-sectional view perpendicular to the longitudinal direction (z), on respective lateral sides by the lateral side walls and on the side facing the interspace by the inner wall. In this optional embodiment, the inner wall may be configured to allow gas exchange between the interspace and the chamber when the spacer is mounted between the glazing panes.

Furthermore, the spacer has a predetermined width (w1) in the width direction (x) corresponding to the predetermined distance and a predetermined height (h1) in the height direction (y). The predetermined width (w1) is a value selected from a range of 10-20 mm, and the predetermined height (h1) is a value selected from a range of 6-8 mm. Furthermore, the inner wall comprises a recess portion having a depth (dr) in the height direction (y) of at least 1.5 mm, a width (w2) in the width direction (x) of at least 2.5 mm and a wall thickness (dt) in a range 20% to 80% of the wall thickness (diw) of other parts of the inner wall. The recess portion is configured to allow the length of the inner wall to change in the width direction in response to an external pressure force or an external tensional force applied to the side walls in the width direction (x).

Further aspects, features and advantages of the present teachings will become apparent from the descriptions of embodiments referring to the drawings.

DETAILED DESCRIPTION OF THE INVENTION

Figure 5:
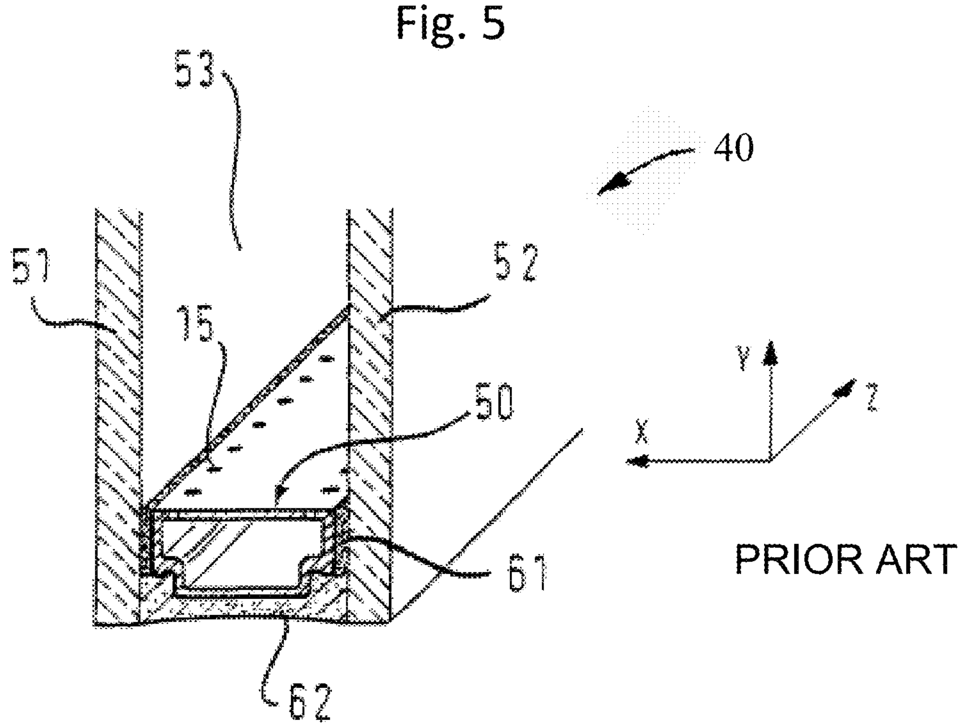
FIG. 5 is a partial perspective cross-sectional view of an insulating glazing unit with a conventional spacer.
Figure 8:
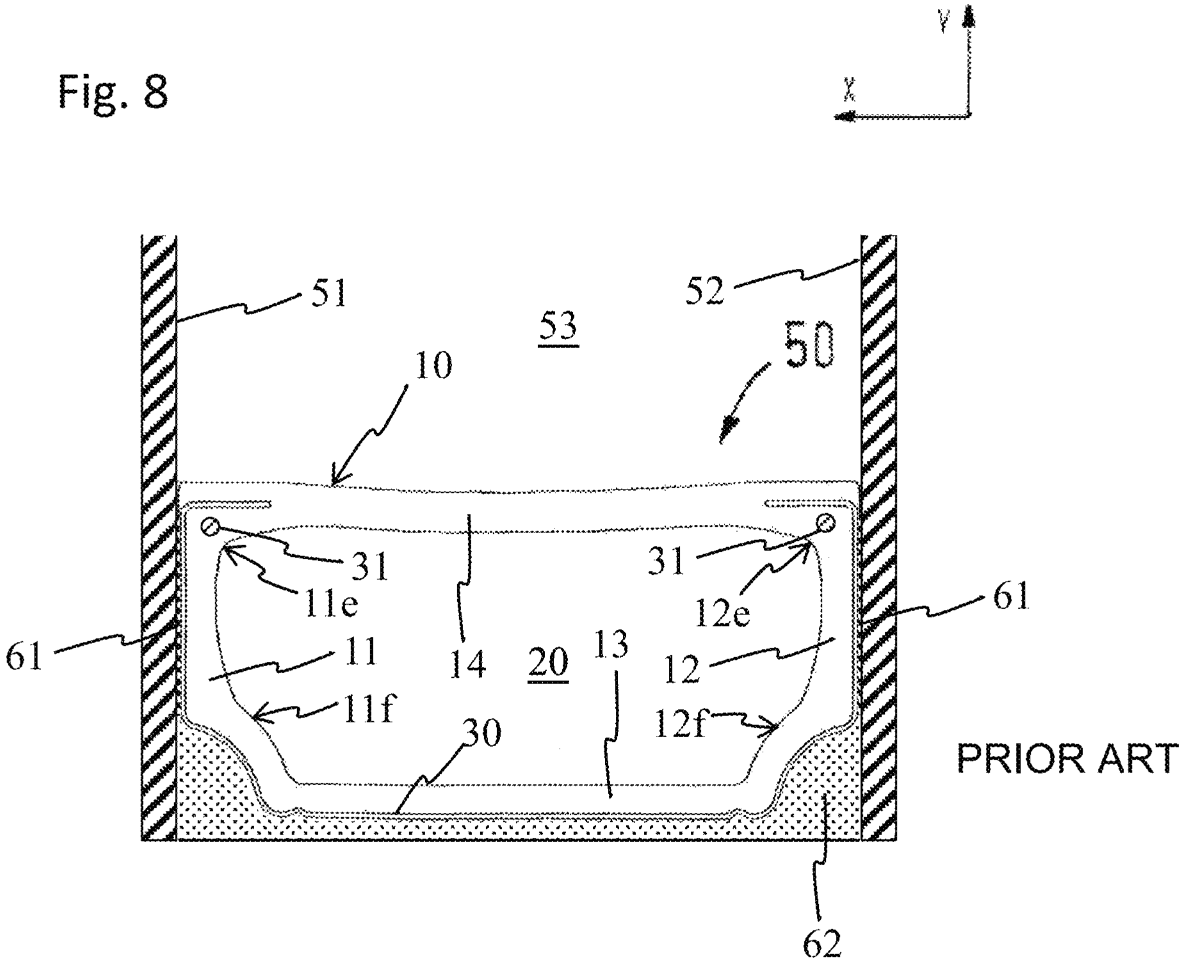
FIG. 8 is a partial cross-sectional view of an insulating glazing unit with the conventional spacer of FIG. 7.

FIG. 5 shows a partial perspective view and FIG. 8 shows a cross-sectional view of an insulating glazing unit (IGU) 40 with a conventional spacer 50. The IGU 40 comprises two glazing panes 51, 52 arranged parallel to each other with (at) a predetermined distance between the same. The spacer 50 extends in a longitudinal direction z along the edges of the glazing panes 51, 52.

FIG. 5 shows a partial perspective view and FIG. 8 shows a cross-sectional view of an insulating glazing unit (IGU) 40 with a spacer 50. The IGU 40 comprises two glazing panes 51, 52 arranged parallel to each other with (at) a predetermined distance between the same. A spacer 50 extends in a longitudinal direction z along the edges of the glazing panes 51, 52.

Figure 6:
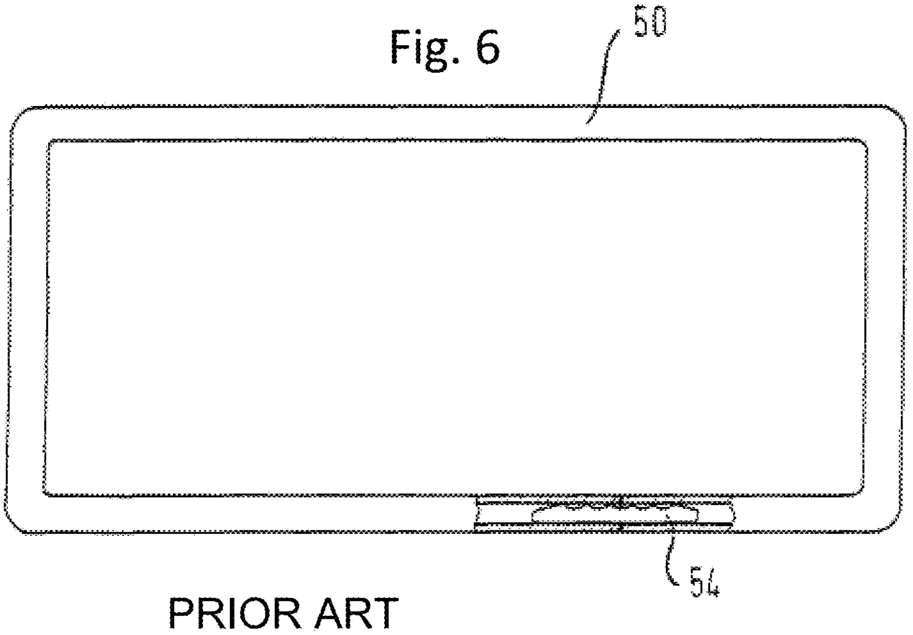
PRIOR ART Fig. 6
FIG. 6 is a side view, partially cut away, of a spacer frame bent from the spacer of FIG. 5.

As shown in FIG. 6, the spacer 50 is used to form a spacer frame, e.g., by cold-bending the spacer profile into a frame shape and connecting the ends with a linear connector 54 as known in the art. Other ways to form a spacer frame, such as cutting linear pieces of spacer frame parts and connecting the same via corner connectors, are also possible as known in the art.

Figure 7:
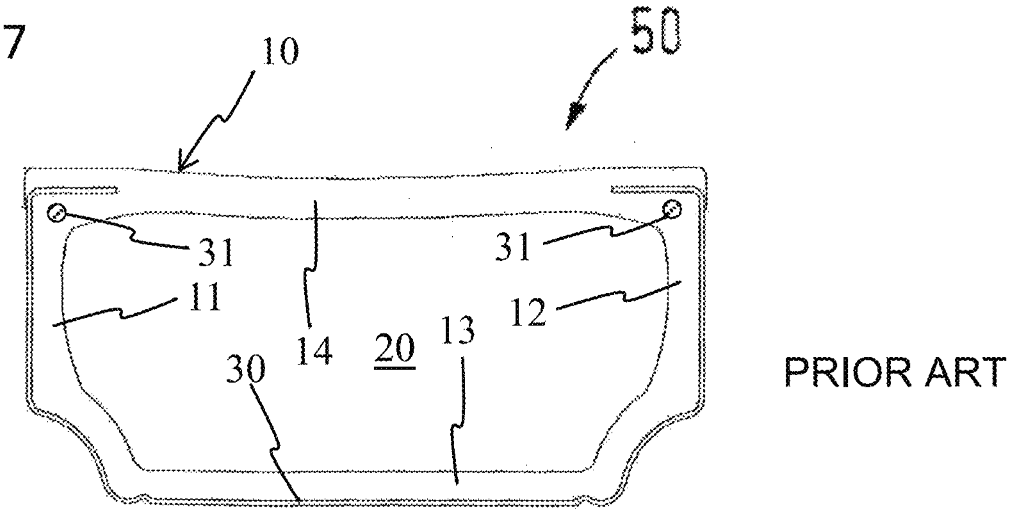
FIG. 7 is a cross-sectional view of the conventional spacer of FIG. 5 perpendicular to its longitudinal direction.

The spacer (frame) 50 is mounted at (along) the edges of the two spaced glazing panes 51, 52. As is shown in FIGS. 5, 7 and 8, the spacer 50 comprises side walls 11, 12 formed as attachment bases to be adhered with (to) the inner sides of the glazing panes 51, 52 using an adhesive material (primary sealing compound) 61, e.g., a butyl sealing compound based upon polyisobutylene. An intervening space (also referred to as interspace or internal space) 53 between the glazing panes is thus defined by the two glazing panes 51, 52 and the spacer profile 50. The inner side of the spacer profile 50 faces the intervening space 53 between the glazing panes 51, 52. On the (outer) side facing away from the intervening space 53 between the glazing panes in the height direction y, a mechanically stabilizing sealing material (secondary sealing compound) 62, for example based upon polysulfide, polyurethane or silicon, is introduced into the remaining, empty space between the inner sides of the window panes in order to fill the empty space. This sealing compound also protects a diffusion barrier layer 30 provided at least on the outer side of the spacer 50. It is also possible to use other possibilities than a gas diffusion barrier layer 30 to provide gas diffusion-proof characteristics, such as selecting corresponding (suitable) gas diffusion-tight materials for the body of the spacer profile.

The interspace 53 between the glazing panes 51, 52 is usually filled with a gas having good heat insulating characteristics like a rare gas (noble gas or inert gas) such as argon or xenon. Thus, a gas filled interspace 53 is present between the glazing panes 51, 52 and the spacer (frame) 50 in the mounted state.

As shown in FIGS. 5, 7 and 8, the spacer 50 comprises a spacer profile body 10. The side walls 11, 12 of the spacer are formed as attachment bases for attachment to the inner sides of the glazing panes. In other words, the spacer is adhered to the respective inner sides of the glazing panes via these attachment bases and the primary sealing compound 61 (see FIG. 5, 8). In addition, the spacer 50 is adhered to the respective inner sides of the glazing panes via the secondary sealing compound 62 (see FIG. 5, 8).

Figure 1:
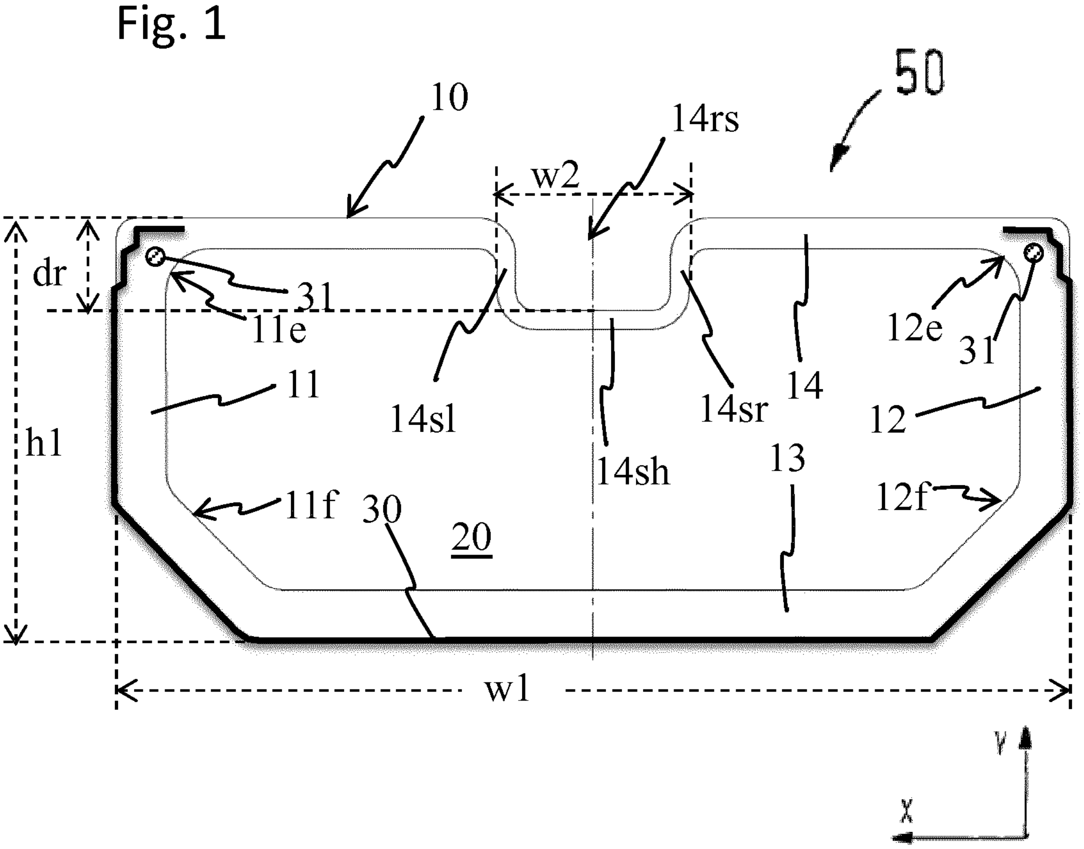
FIG. 1 is a cross-sectional view showing a spacer according to a first embodiment of the present teachings perpendicular to its longitudinal direction.

A spacer 50 according to a first embodiment of the present teachings is shown in FIG. 1. Such a spacer 50 is designed and adapted to be mounted in an IGU 40 in the way shown in FIG. 5 or 8 instead of a spacer of the conventional type shown in FIG. 5 or 7 or 8. The side of the spacer 50, which is the upper side in FIG. 1 and which is the non-diffusion proof side and thus designed to face the gas filled interspace 53 in the mounted state, is named the inner side of the spacer 50 in the following description.

The spacer extends with an essentially constant cross-section x-y in the longitudinal direction z with an overall height h1 in the height direction y perpendicular to the longitudinal direction z. The side walls 11, 12 have a predetermined distance w1 between their lateral outer sides in the width direction x in a state in which no external pressure force or external tensional force is applied to the side walls. The spacer 50 has a generally rectangular cross section perpendicular to the longitudinal direction z.

As shown in FIG. 1, the spacer 50 comprises a spacer profile body 10. The spacer profile body 10 may be made by extrusion of polyamide 66 with 25% glass fibre reinforcement (PA66 GF 25) or could also be made of polypropylene PP with or without fibre reinforcement or of any other suitable materials. The profile body 10 extends in the longitudinal direction z with the two lateral side walls 11, 12 and an inner wall 14 located on the inner side of the spacer and adapted to face the gas filled interspace 53 in the mounted state.

Seen in the cross-section x-y perpendicular to the longitudinal direction z, the two side walls 11, 12 are separated by a distance in the traverse (width) direction x and extend essentially in the height direction y towards the inner side of the spacer up to inner ends 11*e*, 12*e*. The side walls 11, 12 are adapted to face the glazing panes 51, 52 in the width direction x perpendicular to the longitudinal direction z and to the height direction y. The side walls 11, 12 are directly connected with and by the inner wall 14 on the inner side of the spacer.

A one-piece diffusion barrier film 30 is formed on the outer side of the spacer which faces away from the gas filled interspace 53 (from the inner side of the spacer) and on the side walls 11, 12. The diffusion barrier film 30 may be formed partly in the side walls and/or only on part of the side walls or only on the outer side of the spacer. The diffusion barrier film 30 may be made of metal like stainless steel or of another diffusion proof material like diffusion-proof multilayer foils. The diffusion barrier film 30 may optionally be designed to also serve as a reinforcement element. FIG. 1 shows wires 31 in the corner portions on the inner side as other optional reinforcement elements.

An outer wall 13 may optionally be formed on the outer side of the spacer, as shown in FIG. 1. In such a case, the diffusion barrier film 30 is formed on the outer wall 13 as shown in FIG. 1. The outer wall 13 and the side walls 11, 12 may either be directly connected with and by the outer wall 13 or by interposed slant (oblique) wall sections, which may optionally be concave or convex in addition, as shown on FIGS. 1 to 4 and 7 to 14.

A chamber 20 is formed for accommodating hygroscopic (desiccating) material. The chamber 20 is defined in cross-sectional view perpendicular to the longitudinal direction z on its respective lateral sides by the side walls 11, 12 and on its side facing the interspace 53 by the inner wall 14. Openings 15 are formed in the inner wall 14 (not shown in FIG. 1 but see FIG. 5), so that the inner wall 14 is formed to be non-diffusion-proof, thereby allowing gas exchange between the gas filled interspace 53 and the chamber 20. In addition or in the alternative, to achieve a non-diffusion-proof design, it is also possible to select the material for the entire profile body and/or the inner wall, such that the material permits an equivalent diffusion without the formation of the openings 15.

The inner wall 14 comprises a recess portion 14*rs* having a depth dr in the height direction y and a width w2 in the width direction x that allows the length of the inner wall 14 to change in the width direction x in response to an external pressure force or external tensional force applied to the side walls 11, 12 caused by climate stress.

The recess portion 14*rs* has, as viewed in the cross-section x-y perpendicular to the longitudinal direction z, a rectangular shape with three side portions 14*sl*, 14*sh*, 14*sr* formed by the inner wall 14 and an open side facing the gas filled interspace 53 in the mounted state.

The recess portion 14*rs* has a depth dr in the height direction y in a range of 1.5 mm to 2 mm, such as 1.5 mm or 1.75 mm or 2 mm, and a width w2 in the width direction x in a range of 2.5 mm to 4 mm, such as 2.5 mm or 3 mm or 3.5 mm or 4 mm. These values are especially suitable for spacers having a width w1 of 10 to 20 mm and a height h1 of 6 to 8 mm. In general, the depth dr of the (rectangular cross section) recess portion 14*rs* can be up to 50% of the overall (predetermined) height h1 of the spacer profile 50 and the width w2 can be up to 50% of the overall (predetermined) width w1 of the spacer profile 50.

The recess portion 14*rs* is centered in the inner wall 14 in the width direction x. It is also possible that the recess portion 14*rs* has an off-center position, especially if the applied forces may be not symmetrical. However, the centered position is preferred.

The recess portion 14*rs* of the inner wall 14 has a wall thickness which is in a range 20% to 80% of the wall thickness of the other parts of the inner wall 14. The wall thickness of the inner wall is, e.g. 0.5 mm and the thickness of the recess portion is 0.3 mm, i.e., 60%.

The transitions of the side portions 14*sl*, 14*sh*, 14*sr* and the other portions of the inner wall 14 are preferably rounded as shown in FIG. 1.

The depth dr of the recess portion 14*rs* in the height direction y is measured relative to a straight imaginary line connecting the ends of the connections between the inner wall 14 and the side walls 11, 12 in the height direction y. This imaginary line is not completely shown in FIG. 1; rather the end of the imaginary line is shown as hatched line in FIG. 1 at the upper end of the arrow for denoting the measure (dimension) dr.

The spacer is configured such that its outer side, which is formed by either a diffusion barrier 30 or an outer wall 13 or a combination of a diffusion barrier and at least a section of an outer wall, maintains its length in the width direction x in response to an external pressure force or external tensional force applied to the side walls 11, 12 caused by climate stress. In other words, the elements forming the outer side do not allow to change the length of the outer side in the width direction x in response to an external pressure force or external tensional force applied to the side walls 11, 12 caused by climate stress. If the diffusion barrier 30 is designed to provide this characteristic of keeping the length in width direction x constant, this can be achieved by using a material like metal or a multilayer foil of sufficient thickness providing the necessary strength to the outer side of the spacer. In case of stainless steel, the minimum thickness is about 0.06 mm. Also the shape of metal films or foils can help to keep the length in width direction x constant. The metal film or foil can, for example, have corrugations or undulations in the width direction x (perpendicular to longitudinal direction) to increase resistance and strength of the metal film/foil in this direction. If the outer wall 13 is designed to provide this characteristic of keeping the length in width direction x constant, this can be achieved by a corresponding thickness and/or by reinforcements like glass fibres or other fibres. Combinations of the above measures are also possible such as, e.g., metal film sections at the outer side corner portions and a corresponding multilayer foil in between the metal film sections on the outer side, or a foamed outer wall with glass fibre reinforcement of 30 to 40% while the inner wall is not foamed and comprises no glass fibre reinforcement combined with a multilayer foil on the outer side, etc. In FIG. 1, a combination of a metal diffusion barrier 30 having a sufficient thickness to maintain the length in the width direction x on the outer side and of an outer wall 13 is shown as an example.

Figure 2:
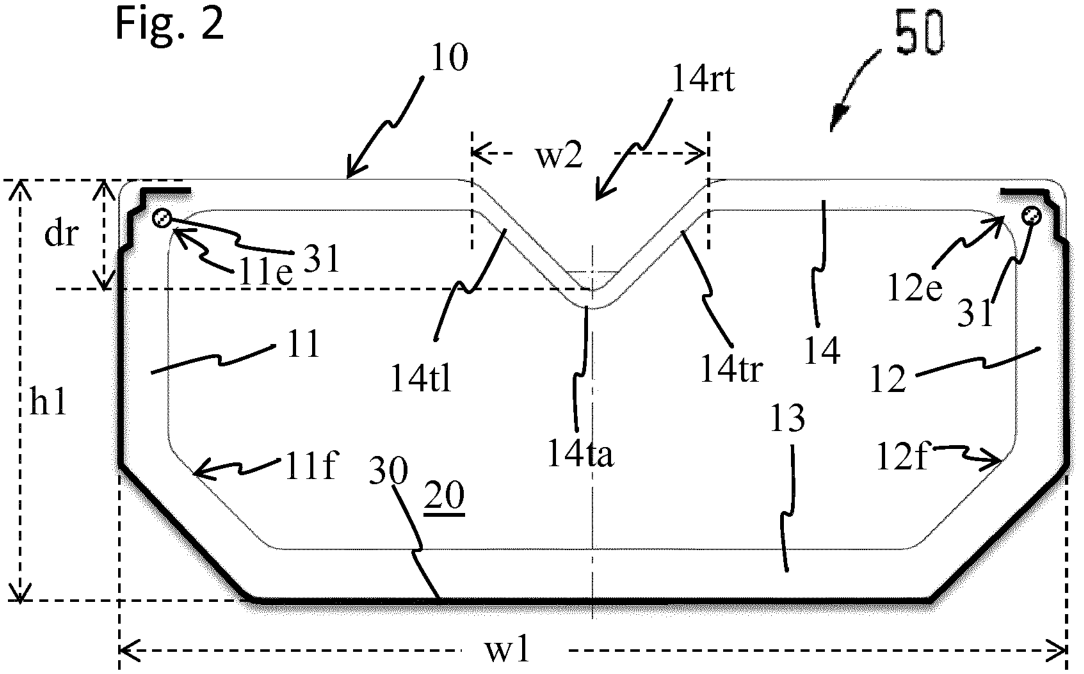
FIG. 2 is a cross-sectional view showing a spacer according to a second embodiment of the present teachings perpendicular to its longitudinal direction.
Figure 4:
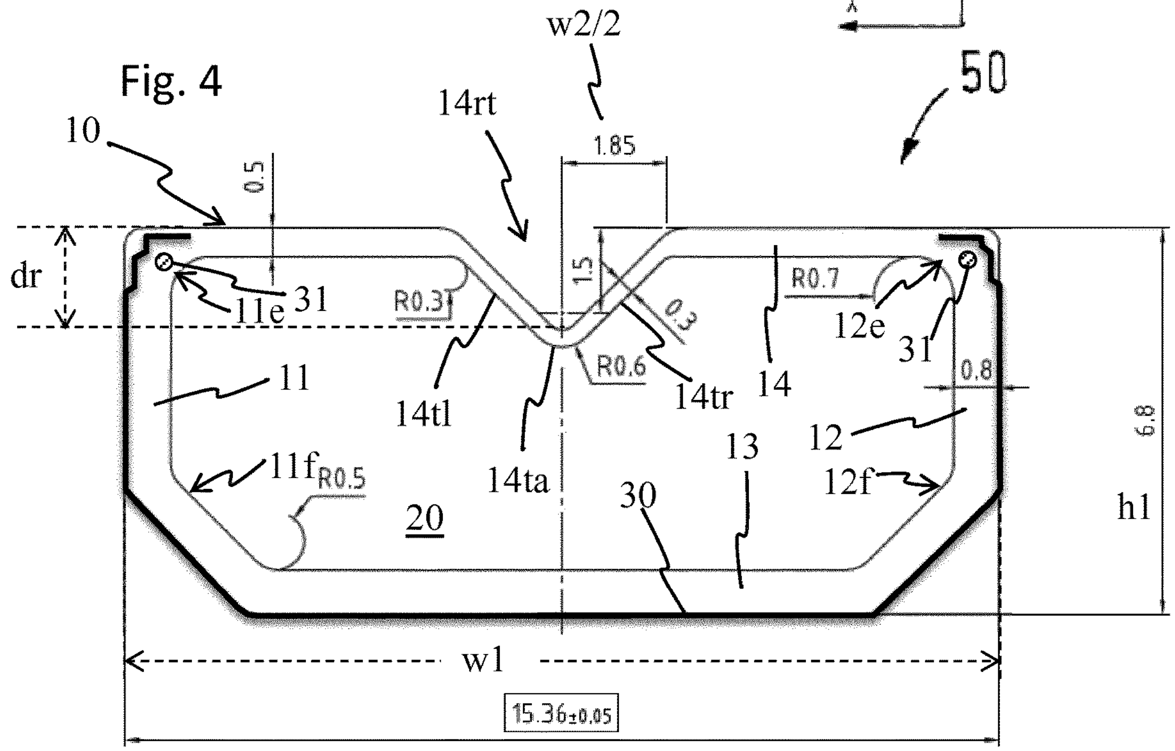
FIG. 4 is a cross-sectional view showing the spacer according to the second embodiment perpendicular to its longitudinal direction with indication of dimensions.

A spacer 50 according to a second embodiment is shown in FIGS. 2 and 4. In FIG. 4, dimensions for a specific size of a spacer for a 16 mm nominal width of the interspace between the panes of an IGU are indicated. The spacer 50 of the second embodiment differs from the spacer 50 of the first embodiment essentially in that it comprises a recess portion 14*rt* instead of the recess portion 14*rs*.

The recess portion 14*rt* has, as viewed in the cross-section x-y perpendicular to the longitudinal direction z, a triangular shape with two side portions 14*tl*, 14*tr* and an apex 14*ta* between the same formed by the inner wall 14 and an open side facing the gas filled interspace 53 in the mounted state. The remaining design and features are the same as in the first embodiment unless described differently in the following.

The inner wall 14 comprises the recess portion 14*rt* having a depth dr in the height direction y and a width w2 in the width direction x that allows the length of the inner wall 14 to change in the width direction in response to an external pressure force or external tensional force applied to the side walls 11, 12 caused by climate stress.

The recess portion 14*rt* has, as viewed in the cross-section x-y perpendicular to the longitudinal direction z, the above described triangular shape.

The recess portion 14*rt* has a depth dr in the height direction y in a range of 1.5 mm to 2.5 mm, such as 1.5 mm or 1.75 mm or 2 mm or 2.25 mm or 2.5 mm, and a width w2 in the width direction x in a range of 3.5 mm to 5 mm, such as 3.5 mm or 4 mm or 4.5 mm or 5 mm. These values are especially suitable for spacers having a width w1 of 10 to 20 mm and a height h1 of 6 to 8 mm. In general, the depth dr of the (triangular cross section) recess portion 14*rt* can be up to 50% of the overall height h1 of spacer profile and the width w2 can be up to 60% of the overall width w1 of spacer profile.

The recess portion 14*rt* of the inner wall 14 has a wall thickness which is in a range 20% to 80% of the wall thickness of the other parts of the inner wall 14. The wall thickness of the inner wall is, e.g. 0.5 mm and the thickness of the recess portion is 0.3 mm, i.e., 60%.

The transitions of the side portions 14*tl*, 14*tr* and an apex 14*ta* and the other portions of the inner wall 14 are preferably rounded as shown in FIGS. 2 and 4.

The depth dr of the recess portion 14*rt* in the height direction y is measured relative to a straight imaginary line connecting the ends of the connections between the inner wall 14 and the side walls 11, 12 in the height direction y. This imaginary line is not completely shown in FIG. 2; rather the end of the imaginary line is shown as hatched line in FIG. 2 at the upper end of the arrow for denoting the measure (dimension) dr.

Figure 3:
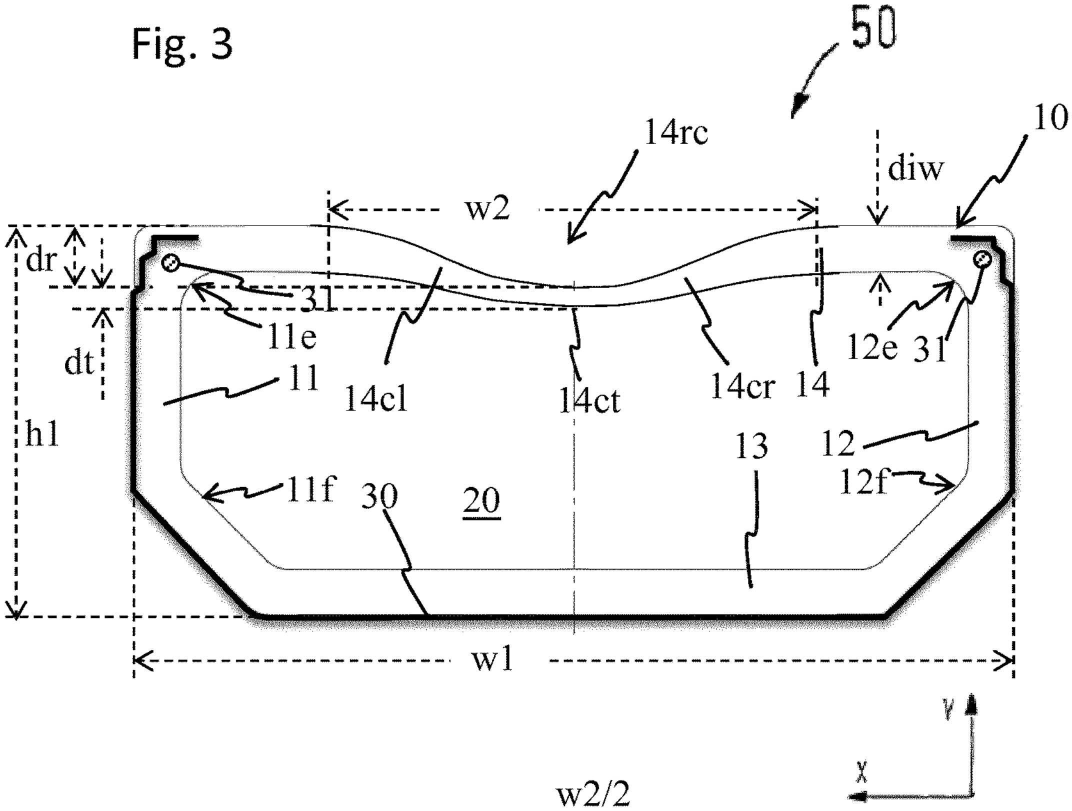
FIG. 3 is a cross-sectional view showing a spacer according to a third embodiment of the present teachings perpendicular to its longitudinal direction.

A spacer 50 according to a third embodiment is shown in FIG. 3. The spacer 50 of the third embodiment differs from the spacer 50 of the first embodiment essentially in that it comprises a recess portion 14*rc* instead of the recess portion 14*rs*.

The recess portion 14*rc* has, as viewed in the cross-section x-y perpendicular to the longitudinal direction z, a curved shape with curved portions 14*cl*, 14*cr* and a thin portion 14*ct* formed by the inner wall 14 and a convex curvature facing away from the gas filled interspace 53 in the mounted state. The curvature could also be described as concave as viewed from the chamber 20. The remaining design and features are the same as in the first embodiment unless described differently in the following.

The inner wall 14 comprises the recess portion 14*rc* having a depth dr in the height direction y and a width w2 in the width direction x that allows the length of the inner wall 14 to change in the width direction x in response to an external pressure force or external tensional force applied to the side walls 11, 12 caused by climate stress.

The recess portion 14*rt* has, as viewed in the cross-section x-y perpendicular to the longitudinal direction z, the above described curved shape.

The recess portion 14*rc* has a depth dr in the height direction y in a range of 1.5 mm to 2.5 mm, such as 1.5 mm or 1.75 mm or 2 mm or 2.25 mm or 2.5 mm, and a width w2 in the width direction x in a range of 4 mm to 9 mm, such as 4 mm or 5 mm or 6 mm or 7 mm or 8 mm or 9 mm. These values are especially suitable for spacers having a width w1 of 10 to 20 mm and a height h1 of 6 to 8 mm. In general, the depth dr of the (curved cross section) recess portion 14*rc* can be up to 50% of the overall height h1 of spacer profile and the width w2 can be up to 80% of the overall width w1 of spacer profile.

The recess portion 14*rc* of the inner wall 14 has a minimum wall thickness dt which is in a range 20% to 80% of the wall thickness of the other parts of the inner wall 14. The wall thickness diw of the inner wall is, e.g., 0.8 mm and the thickness of the recess portion is 0.4 mm, i.e., 50%.

The depth dr of the recess portion 14*rc* in the height direction y is measured relative to a straight imaginary line connecting the ends of the connections between the inner wall 14 and the side walls 11, 12 in the height direction y. This imaginary line is not completely shown in FIG. 3; rather, the end of the imaginary line is shown as hatched line in FIG. 3 at the upper end of the arrow for denoting the measure (dimension) dr.

Figure 9:
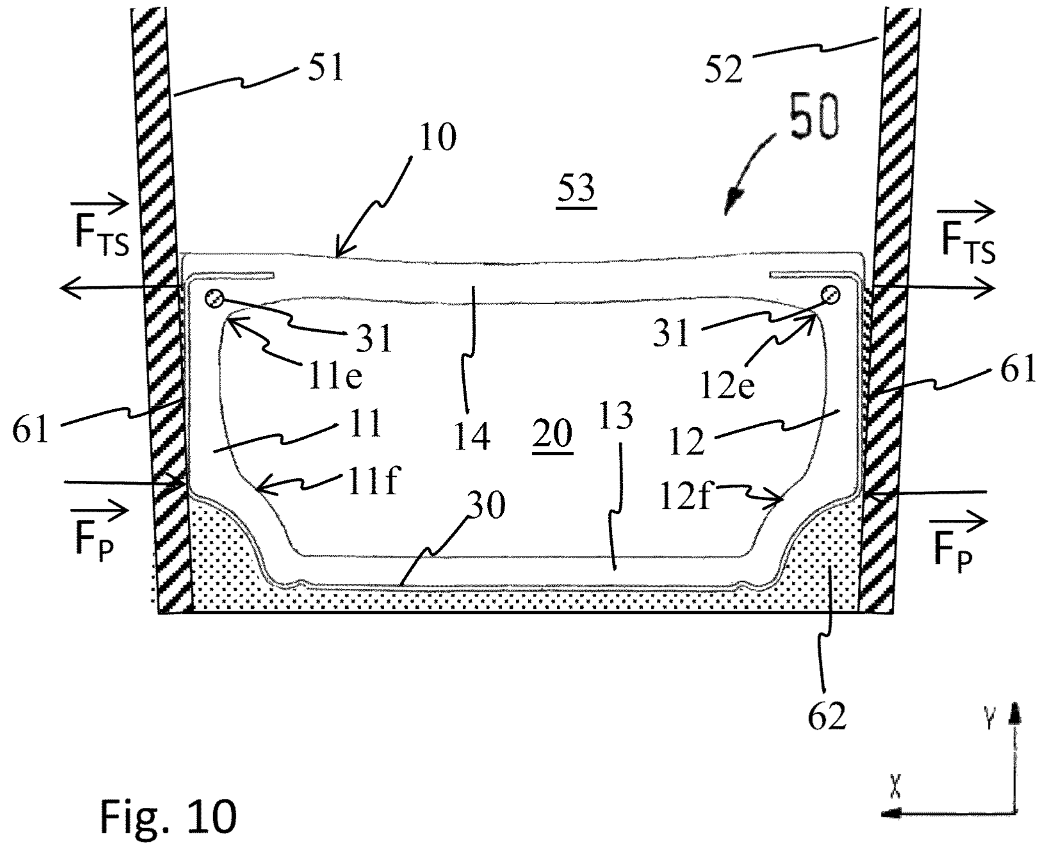
Fig. 9 PRIOR ART
FIG. 9 is a partial cross-sectional view of an insulating glazing unit corresponding to FIG. 8 exemplifying the effect of increased gas pressure inside the IGU.

The IGU of FIG. 5 or 8 is subject to heating and cooling due to external conditions. If the IGU is heated, the gas in the interspace 53 is heated and, because the interspace is hermetically sealed, the gas pressure in the interspace 53 increases in comparison to the (atmospheric) pressure outside the IGU. This results in pressure forces acting on the glazing panes and bending the same to form convex shapes as shown in FIG. 9. If the IGU is cooled, the opposite effect occurs. The gas in the interspace 53 is cooled and, because the interspace 53 is hermetically sealed, the gas pressure in the interspace 53 decreases in comparison to the (atmospheric) pressure outside the IGU. This results in pressure forces acting on the glazing panes and bending the same to form concave shapes as shown in FIG. 10.

As a result of heating the IGU, tensile stress forces Frs act on the primary sealing 61 in the region at the inner ends 11*e*, 12*e* of the lateral side walls 11, 12 of the conventional spacer 50 located at (on) the inner side facing the interspace 53 as shown in FIG. 9. These tensile stress forces Frs may cause a separation of the primary sealing 61 from the glazing pane 51 and/or 52 and/or the conventional spacer (50) and thus damage the sealing effect, which is detrimental to the long term life of IGUs due to thermal cycling behaviour. The pressure forces $F_P$ acting on the conventional spacer 50 at the remote ends 11*f*, 12*f* of the side walls 11, 12 of the conventional spacer 50 remote to the interspace 53 and on the secondary sealing 62 are not so problematic although they cause stress (compression) in the primary and secondary sealing materials 61, 62.

Figure 10:
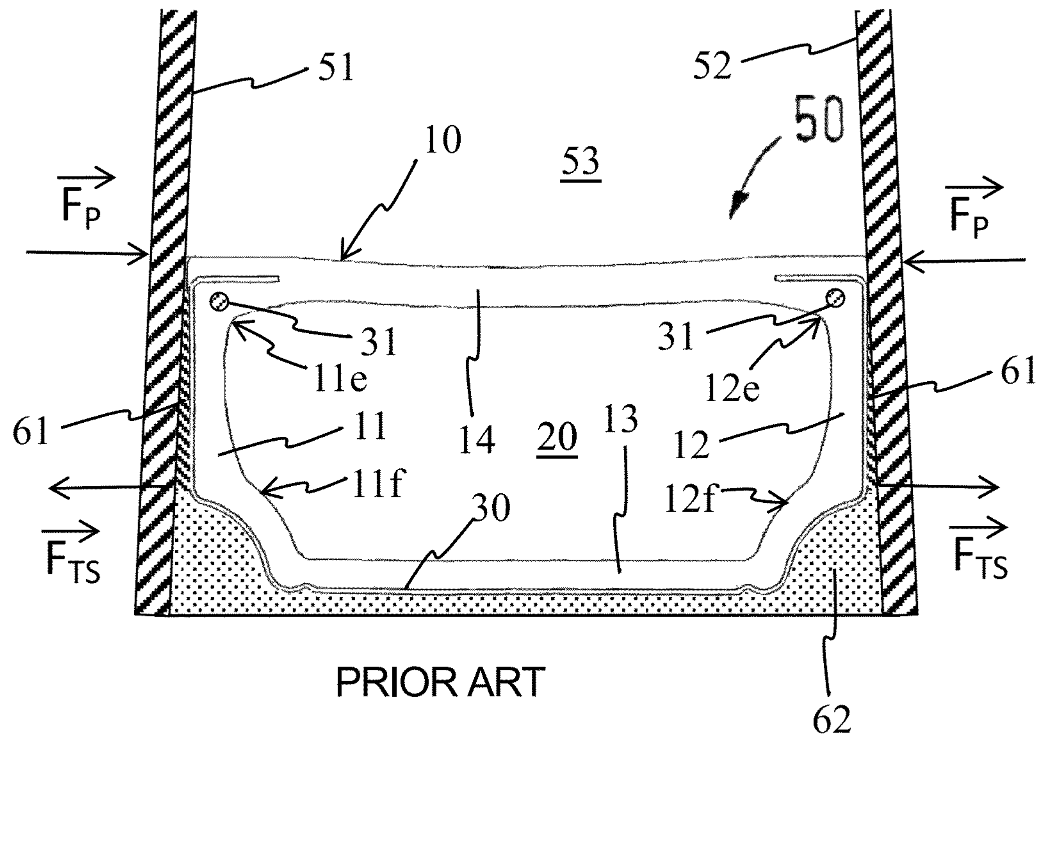
FIG. 10 is a partial cross-sectional view of an insulating glazing unit corresponding to FIG. 8 exemplifying the effect of reduced gas pressure inside the IGU.

As a result of cooling the IGU, tensile stress forces FTS act on the primary sealing 61 in the region at the remote ends 11*f*, 12*f* of the side walls 11, 12 of the conventional spacer 50 remote to the interspace 53 and on the secondary sealing 62 as shown in FIG. 10. These tensile stress forces FTS may cause a separation of the primary and/or secondary sealings 61, 62 from the glazing pane 51 and/or 52 and/or the conventional spacer 50 and thus damage the sealing effect, which is detrimental to the long term life of IGUs due to thermal cycling behaviour. The pressure forces FP acting on the conventional spacer 50 in the region at the inner ends 11*e*, 12*e* of the lateral side walls 11, 12 of the conventional spacer 50 located at the inner side facing the interspace 53 are not so problematic although they cause stress (compression) in the primary and secondary sealing materials 61, 62.

The effects of heating and cooling an IGU may be caused by usual climate changes in winter and summer, the weather, the change of day and night, and/or air condition and heating. Therefore, the effects occur in an alternating manner and threaten the intended lifetime of IGUs.

The recess portion 14*rs* of the first embodiment allows the inner ends 11*e*, 12*e* of the side walls 11, 12 to move away from each other in reaction to tensile stress forces $F_{TS}$ shown in FIG. 9. The recess portion 14*rs* also allows the inner ends 11*e*, 12*e* of the side walls 11, 12 to move towards each other in reaction to pressure forces $F_P$ shown in FIG. 10. The reason is that the recess portion allows a change of the length of the inner wall 14 in the width direction in response to an external pressure force or external tensional force applied to the side walls 11, 12 caused by climate stress. The recess portion 14*rs* has three side portions 14*sl*, 14*sh*, 14*sr*, which can change their relative angles and the relative angles with respect to the other portions of the inner wall 14 under tension or pressure. If the relative angles change, the length of the inner wall 14 inevitably varies in the width direction x.

In other words, the recess portion 14*rs* allows the distance between the lateral outer sides of the side walls 11, 12 at the inner ends 11*e*, 12*e* to change from the predetermined distance w1 in a state in which an external pressure force or an external tensional force is applied to the side walls 11, 12. The distance between the lateral outer sides of the side walls 11, 12 at the remote ends 11*f*, 12*f* is not changed from the predetermined distance w1 in a state in which an external pressure force or an external tensional force is applied to the side walls. With dimensions of the recess portion 14*rs* of dr=1.5 mm and w2=2.5 mm for a spacer having a width w1=16 mm and a height h1=7 mm, a change of the width at the corresponding inner ends 11*e*, 12*e* in a range up to 0.7 mm is achievable.

Thus, an improved spacer for IGUs is provided with superior climate stress compensation characteristics. Such an improved spacer is flexible enough owing to its design to reduce the stress on the primary and also the secondary sealing material such that gas loss is reduced and the overall lifetime of the IGU can be extended. Additionally, less amount of secondary sealing material can be used, thus improving the thermal performance of the IGU.

The same applies to the recess portion 14*rt* of the second embodiment, which is a presently preferred embodiment. In the second embodiment, the relative angles can change in a similar way in response to an external pressure force or external tensional force applied to the side walls 11, 12 caused by climate stress.

Essentially the same also applies to the third embodiment. Due to the curved design of the recess portion 14*rc*, the length change of the inner wall 14 is obtained by straightening the curvature or by increasing the curvature.

The above described effects are shown for the third embodiment in FIGS. 11 and 12, as described below.

Figure 11:
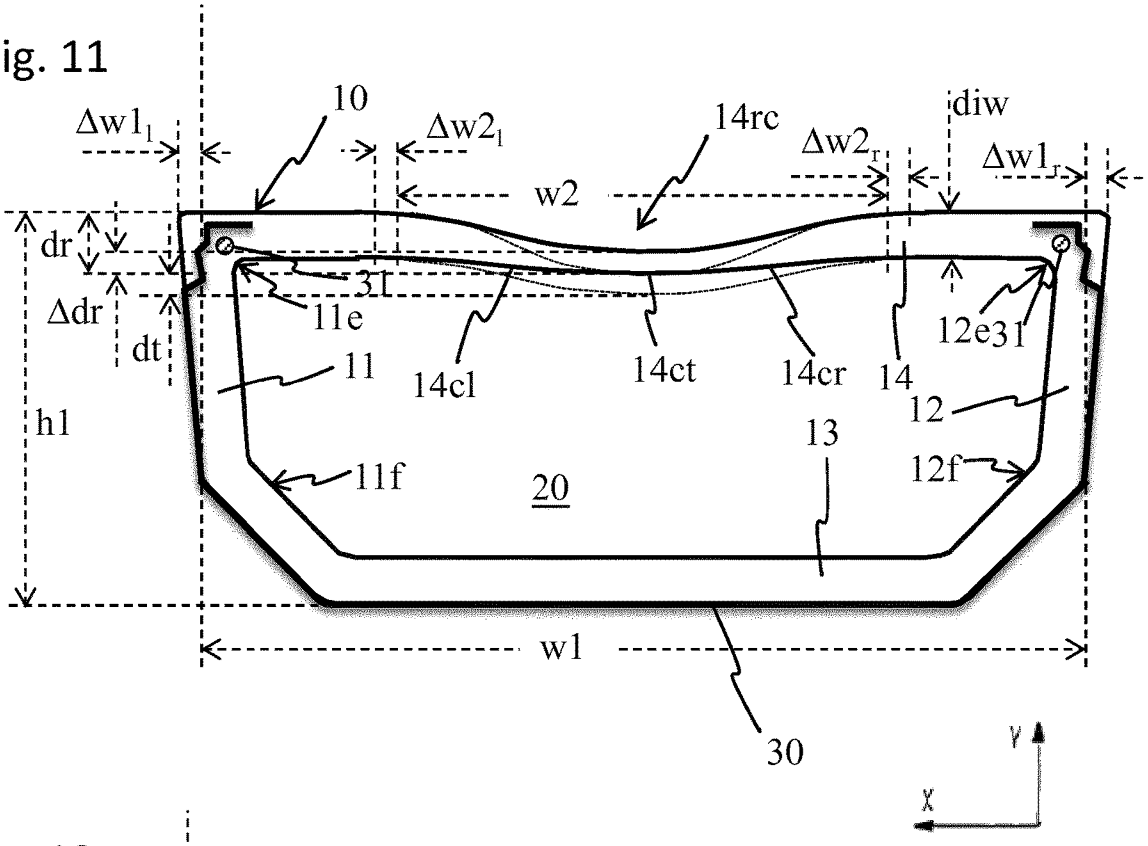
FIG. 11 is a partial cross-sectional view of the spacer of the third embodiment shown in FIG. 3 exemplifying the effect of increased gas pressure inside an IGU on this spacer.
Figure 12:
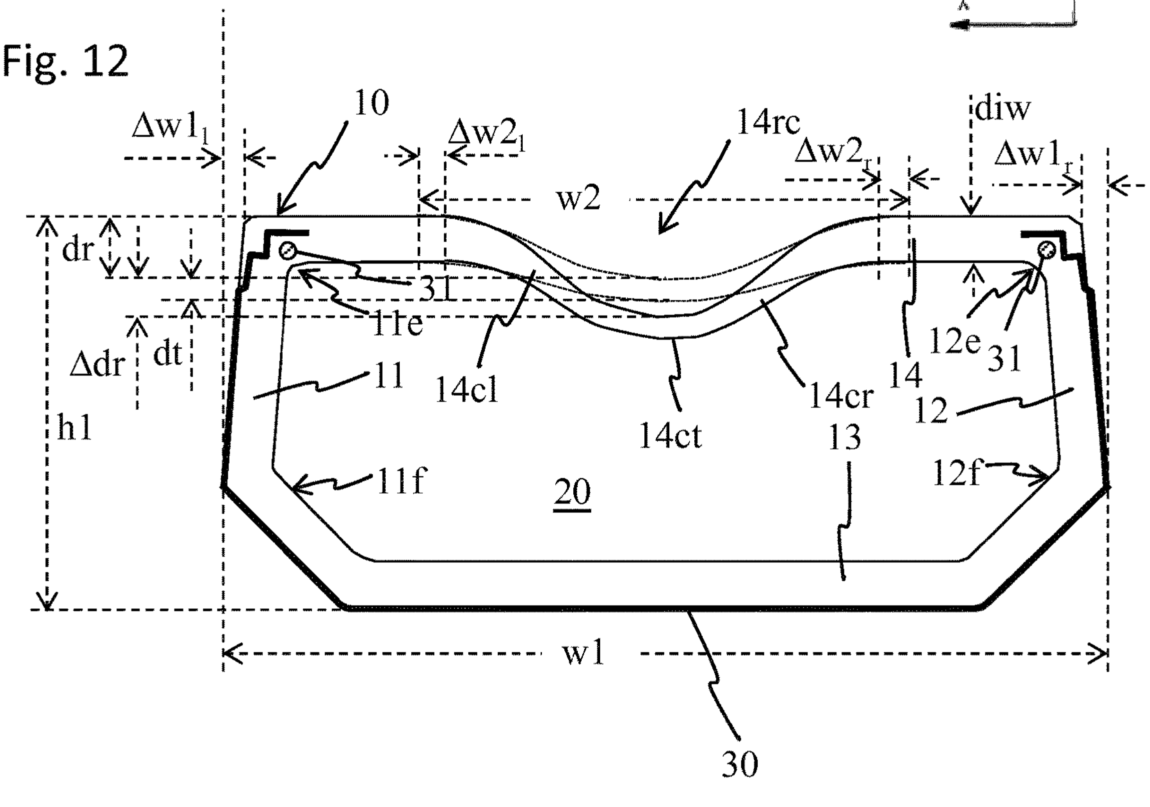
FIG. 12 is a partial cross-sectional view of the spacer of the third embodiment shown in FIG. 3 exemplifying the effect of reduced gas pressure inside an IGU on this spacer.

FIG. 11 shows a partial cross-sectional view of the spacer of the third embodiment shown in FIG. 3, in which the effect of increased gas pressure in the IGU (see FIG. 9) on this spacer is exemplified, and FIG. 12 shows a partial cross-sectional view of the spacer of the embodiment shown in FIG. 3, in which the effect of reduced gas pressure in the IGU (see FIG. 10) on this spacer is exemplified. The reference signs and the corresponding parts and meanings are the same except if differences are explained below.

As a result of increased gas pressure in the IGU, tensile stress forces $F_{TS}$ act on the primary sealing 61 in the region at the inner ends 11*e*, 12*e* of the lateral side walls 11, 12 of the spacer 50 located at the inner side facing the interspace 53 as shown in FIGS. 9 and 11. Different from the conventional design shown in FIG. 9, the recess portion 14*rc* of the third embodiment allows the inner ends 11*e*, 12*e* of the side walls 11, 12 to move away from each other in reaction to tensile stress forces $F_{TS}$ as shown in FIG. 11.

This movement is enabled/allowed by the design of the inner wall 14 with the (in this embodiment curved and concave) recess portion 14*rc* and the reduced wall thickness dt of the inner wall section forming the recess portion. As illustrated in FIG. 11, the inner ends 11*e*, 12*e* of the side walls 11, 12 can move away from each other by a distance of 2Δw1 (indicated as $\Delta w1_l$ on the left side and as $\Delta w1_r$ on the right side in FIG. 11), thus increasing the length of the inner wall 14 in the width direction x. The distances $\Delta w1_i$ are a result of straightening the curved recess portion 14*rc* under (in response to) the tensile stress caused by the tensile stress forces $F_{TS}$ increasing the length of the curved recess portion 14*rc* in the width direction x by a distance of 2Δw2 (indicated as $\Delta w2_l$ on the left side and as $\Delta w2_r$ on the right side in FIG. 11). The depth dr of the recess portion 14*rc* in the height direction y is reduced by Δdr.

The shape of the recess portion 14*rc* without the acting forces is shown as hatched lines in FIG. 11. When the forces are no longer acting, usually because the temperature has changed and the increased pressure does not act anymore, the recess portion returns to this "force-free" state. In other words, the recess portion 14*rc* is configured as an elastically deformable portion enabling/allowing the change of length of the inner wall 14.

On the other hand, the remote ends 11*f*, 12*f* of the side walls 11, 12 do not move in reaction to the reaction to the pressure forces $F_P$ shown in FIG. 9. In other words, due to the non-elastic configuration of the outer side of the spacer, in this case the barrier film 30 and the outer wall 13, the width w1 remains unchanged on the outer side of the spacer.

As a consequence, the danger that the tensile stress forces $F_{TS}$ could cause a separation of the primary sealing 61 from the glazing pane and/or the spacer at the inner ends is overcome or at least significantly reduced, different from the case shown in FIG. 9, because the movement of the inner ends due to the increased length of the inner wall 14 relieves this stress and thus prevents damage to the sealing effect.

As a result of reduced gas pressure in the IGU, pressure forces $F_P$ act on the spacer in the region at the inner ends 11*e*, 12*e* of the lateral side walls 11, 12 of the spacer 50 located at the inner side facing the interspace 53 as shown in FIGS. 10 and 12, while tensile stress forces $F_{TS}$ act on the primary sealing 61 in the region at the remote ends 11*f*, 12*f* of the side walls 11, 12 of the conventional spacer remote to the interspace 53 and on the secondary sealing 62 as shown in FIG. 10.

The recess portion 14*rc* of the third embodiment allows the inner ends 11*e*, 12*e* of the side walls 11, 12 to move towards each other in reaction to pressure forces $F_P$ as shown in FIG. 12. This is enabled/allowed by the design of the inner wall 14 with the (in this case curved and concave) recess 14*rc* and the reduced wall thickness dt of the inner wall section forming the recess. As illustrated in FIG. 12, the inner ends 11*e*, 12*e* of the side walls 11, 12 can move towards each other by a distance of 2Δw1 (indicated as $\Delta w1_l$ on the left side and as $\Delta w1_r$ on the right side in FIG. 12), thus reducing the length of the inner wall 14 in the width direction x. The distances $\Delta w1_i$ are a result of increasing the curvature of the curved recess portion under (in response to) the pressure caused by the pressure forces $F_P$ reducing the length of the curved recess portion 14*rc* by a distance of 2Δw2 (indicated as $\Delta w2_l$ on the left side and as $\Delta w2_r$ on the right side in FIG. 12). The depth dr of the recess portion 14*rc* in height direction y is increased by Δdr.

The shape of the recess portion 14*rc* without the acting forces is shown as hatched lines in FIG. 12. When the forces are no longer acting, usually because the temperature has changed and the reduced pressure does not act anymore, the recess portion returns to this "force-free" state. In other words, the recess portion 14*rc* is configured as an elastically deformable portion enabling/allowing the change of length of the inner wall 14.

As a result, there will be no or significantly reduced (in comparison to the conventional spacer of FIG. 10) tensile stress forces $F_{TS}$ acting on the remote ends 11*f*, 12*f* of the side walls 11, 12, which cannot and do not move in reaction to the reaction to tensile forces $F_{TS}$ shown in FIG. 10. Due to the non-elastic configuration of the outer side of the spacer, in this case the barrier film 30 and the outer wall 13, the width w1 remains unchanged on the outer side of the spacer also in this case. However, due to the elastic behaviour of the inner wall, no significant stress is exerted on the remote ends 11*f*, 12*f* of the side walls 11, 12.

As a result, the danger that the tensile stress forces $F_{TS}$ could cause a separation of the primary sealing 61 from the glazing pane and/or the spacer at the remote ends is overcome or at least significantly reduced, different from the case shown in FIG. 10, because the movement of the inner ends due to the reduced length of the inner wall 14 relieves this stress and thus prevents damage to the sealing effect.

Essentially the same also applies to the other embodiments. Due to the design of the recess portions, an elastic deformation to increase or reduce the length of the inner wall 14 is enabled/allowed. In spacers according to the present teachings, the recess portion 14*rs*, 14*rt*, 14*rc* is adapted to change the length of the inner wall 14 by elastic deformation of the recess portion 14*rs*, 14*rt*, 14*rc*.

Figure 13:
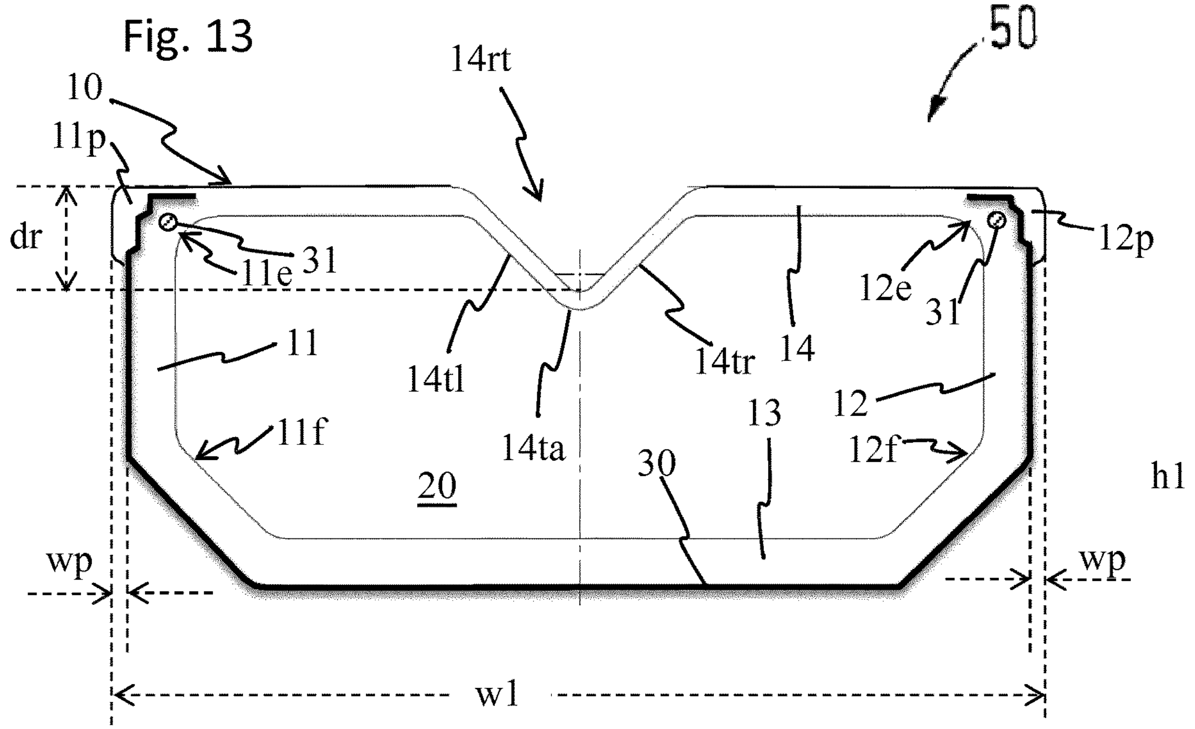
FIG. 13 is a cross-sectional view showing a spacer according to a fourth embodiment of the present teachings perpendicular to its longitudinal direction.
Figure 14:
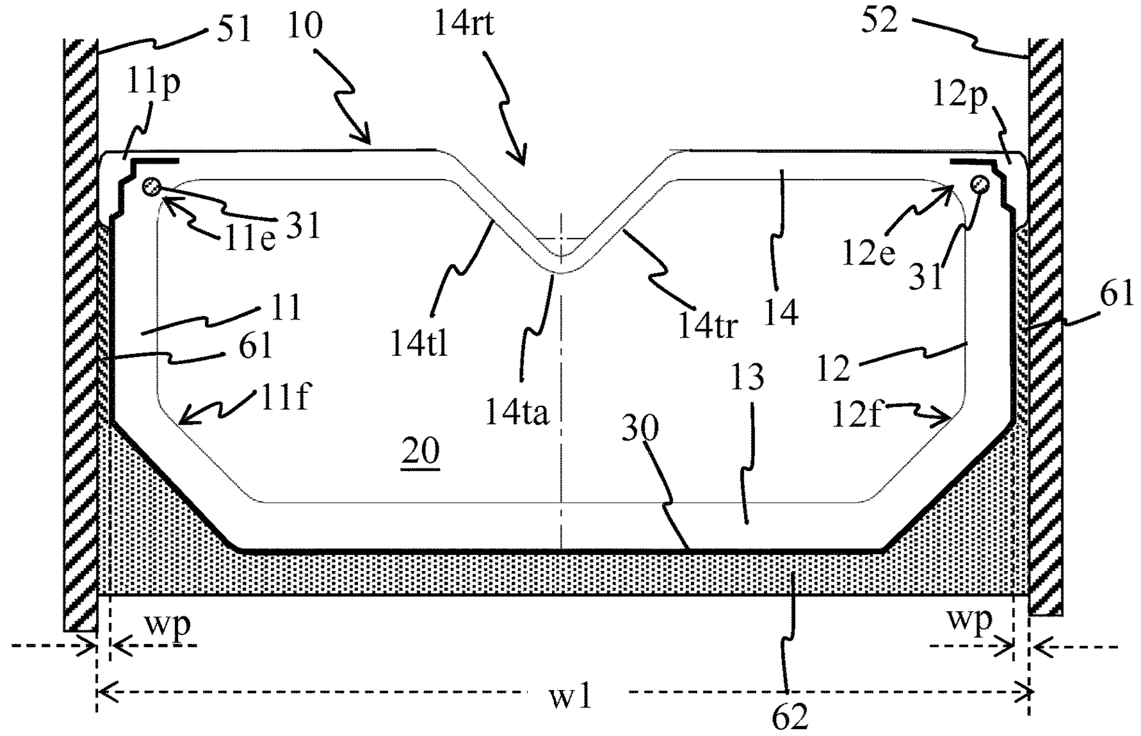
FIG. 14 is a partial cross-sectional view of an insulating glazing unit with the spacer of FIG. 13.

The primary sealing 61 can be further protected by means of a special design of the inner wall 14 and the side walls 11, 12 of the spacer 50. Said design is described and shown in WO 2014/063801 A1 on pages 7, 8, and 17 as step-like transition or step with a width h3 and in FIG. 1 (corresponding to paragraphs [0035] and [0089] and FIG. 1 of EP 2 780 528 B1), which corresponding disclosure is herein incorporated by reference. FIGS. 13 and 14 show an application of this special design with a step-like transition or step or protrusion in the width direction x to the present teachings exemplified by the second embodiment. Of course, the design can be applied to all embodiments. A corresponding step is also shown in DE 20 2016 008 421 U1.

Spacer 50 of the fourth embodiment shown in FIGS. 13 and 14 differs from the spacer of the second embodiment shown in FIG. 2 in that the spacer comprises a transition between the inner wall 14 and the side walls 11, 12 at the lateral outer sides in the form of projections (or extensions or shoulders) 11*p*, 12*p* in the width direction x which create a step-like transition. The width wp of each projection 11*p*, 12*p* corresponds to the width of the primary sealing 61 in the assembled state of the IGU as shown in FIG. 14. The width wp is preferably in a range from 0.01 mm to 1 mm, more preferably between 0.05 mm and 0.5 mm, more preferably between 0.1 mm and 0.4 mm, e.g., 0.2 mm or 0.25 mm or 0.3 mm or 0.35 mm. The width wp of one protrusion is preferably selected to correspond to the width of the primary sealing 61 on one lateral side in the width direction x. Therefore, the total width w1 of the spacer 50 measured between outermost lateral side surfaces of the projections 11*p*, 12*p* in the assembled state of the IGU in a state in which no pressure forces $F_P$ or tensile stress forces Frs forces due to climate conditions are present, corresponds to the distance (nominal width) between the window panes 51, 52.

Such a step-like transition/protrusion 11*p*, 12*p* creates a cavity between the corresponding adjacent glass pane 51, 52 and the corresponding side wall 11, 12 of spacer in which the primary sealing 61 is accommodated. The projections 11*p*, 12*p* are intended to contact the glass panes 51, 52 and to transmit the pressure forces $F_P$ or tensile stress forces $F_{TS}$ to the spacer without stressing the primary sealing 61 or at least significantly reducing the stress. Without such step-like transitions/projections, the primary sealing 61 is an intermediate layer between the glass panes and the side walls of spacer 50 and acts as a force transmitting layer with potentially detrimental consequences on its integrity and durability as a sealing agent. With the provision of such protrusions 11*p*, 12*p*, the primary sealing 61 is relieved of the duty to transmit these forces and can better fulfill its primary function, i.e. to be a sealing layer between the glass panes and the side walls of the spacer.

Additionally, the shoulders prevent the primary sealing 61 from being squeezed out and moving into the interspace 53 (both during the IGU manufacturing process and also during the lifetime of IGU due to the above described climate effects), which is undesired and aesthetically not pleasant.

Spacers of present teachings having a recess portion in the inner wall should in principle be as flexible as or more flexible than the primary sealing due to the provision of the recess in the inner wall, in order not to stress the primary sealing. To enhance the effects, the above described special design of the projections (step-like transitions) relieves the primary sealing because protrusions directly take (absorb) the force exerted by the glass panes that would otherwise have to be taken (absorbed) by the primary sealing, at least partially.

Another means to make the spacer of the present teachings as flexible as or more flexible than the primary sealing is to provide a foamed inner wall 14 in addition to the recess in the inner wall.

Alternatively, it is possible to provide a spacer with a foamed inner wall 14 and with a recess having a depth dr in the height direction y of less than 1.5 mm and with the remaining features described above for the different embodiments.

For all embodiments, the dimensions and shapes of the recesses have been described as especially suitable for spacers having a width w1 in a range from 10 mm to 20 mm and a height h1 in a range from 6 mm to 8 mm. However, the teachings are also applicable to spacers having a width w1 up to 32 mm or up to 40 mm and/or with a width w1 down to 8 mm and with a height h1 up to 10 mm.

Additional aspects (embodiments) of the present teachings include, but are not limited to:

Aspect 1: Spacer for an insulating glazing unit (40), which insulating glazing unit has at least two spaced glazing panes (51, 52) connected at their edges via the spacer (50) in a mounted state in which the spacer is mounted at the edges to limit an interspace (53) filled with gas, the spacer extending with an essentially constant cross-section (x-y) in a longitudinal direction (z), the spacer comprising a plastic body (10) extending in the longitudinal direction (z) with two lateral side walls (11, 12) and an inner wall (14) located on an inner side of the spacer adapted to face the gas filled interspace (53) in the mounted state, in which the side walls are adapted to face the glazing panes in a width direction (x) perpendicular to the longitudinal direction (z), the side walls (11, 12) extend, in the cross section (x-y), in a height direction (y) perpendicular to the longitudinal direction (z) and the width direction (x) towards the inner side up to inner ends (11*e*, 12*e*), the side walls have a predetermined distance (w1) between their lateral outer sides at the inner ends in a state in which no external pressure force or external tensional force is applied to the side walls, the inner wall (14) connects the side walls on the inner side of the spacer, the inner wall (14) comprises a recess portion (14*rs*, 14*rt*, 14*rc*) having a depth (dr) in the height direction (y) of at least 1.5 mm and a width (w2) in the width direction (x) of at least 2.5 mm allowing to change the length of the inner wall in the width direction in response to an external pressure force or external tensional force applied to the side walls (11, 12) in the width direction (x).

Aspect 2: Spacer according to aspect 1, wherein the recess portion (14*rs*) has, in the cross section (x-y), a rectangular shape with three side portions (14*sl*, 14*sh*, 14*sr*) formed by the inner wall (14) and an open side facing the gas filled interspace (53) in the mounted state.

Aspect 3: Spacer according to aspect 1, wherein the recess portion (14*rt*) has, in the cross section (x-y), a triangular shape with two side portions (14*tl*, 14*tr*) and an apex (14*ta*) between the same formed by the inner wall (14) and an open side facing the gas filled interspace (53) in the mounted state.

Aspect 4: Spacer according to aspect 1, wherein the recess portion (14*rc*) has, in the cross section (x-y), a curved shape with curved portions (14*cl*, 14*ct*) and a thin portion (14*cr*) formed by the inner wall (14) and a concave curvature facing away from the gas filled interspace (53) in the mounted state.

Aspect 5: Spacer according to any one of the preceding aspects, wherein the recess portion (14*rs*, 14*rt*, 14*rc*) of the inner wall (14) has a wall thickness (dt) which is in a range 20% to 80% of the wall thickness (diw) of the other parts of the inner wall (14).

As was described above and can be seen in FIGS. 1-4 and 13-14, the depth (dr) of the recess portion (recess) 14*rs*, 14*rt*, 14*rc* of each of the first to fourth embodiments of the present teachings is measured from a straight virtual line, which extends along the outermost (upper in FIGS. 1-4 and 13-14) surface of the inner wall 14 from one lateral end of the spacer 50 to the opposite lateral end, to the deepest portion of the outermost (upper in FIGS. 1-4 and 13-14) surface of the recess portion (recess) 14*rs*, 14*rt*, 14*rc*. Here, it is noted again that these outermost surfaces are the surfaces that face the interspace 53, which is typically filled with a rare gas, between the window panes 52 of an IGU 40 assembled in the manner shown in FIG. 5 using a spacer 50 according to the present teachings. As can also be seen in FIGS. 1-4 and 13-14, the deepest portion of the outermost (upper in FIGS. 1-4 and 13-14) surface of the recess portion (recess) 14*rs*, 14*rt*, 14*rc* is disposed more inward towards the chamber 20 than an innermost surface (lower in FIGS. 1-4 and 13-14) of the inner wall 14 on the lateral sides opposite of the recess portion (recess) 14*rs*, 14*rt*, 14*rc*. That is, with reference to the orientation shown in FIGS. 1-4 and 13-14, the deepest portion of the outermost surface of the recess portion (recess) 14*rs*, 14*rt*, 14*rc* is located below the innermost surface of the inner wall 14 that faces the chamber 20 on the lateral sides opposite of the recess portion (recess) 14*rs*, 14*rt*, 14*rc*.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A spacer for use in manufacturing an insulating glazing unit, in which edges of at least two spaced-apart glazing panes are connected via the spacer in a mounted state in which the spacer is mounted along the edges to limit an interspace filled with gas, the spacer extending with an essentially constant cross-section (x-y) in a longitudinal direction (z), the spacer comprising:

a plastic body extending in the longitudinal direction (z) and having two lateral side walls and an inner wall located on an inner side of the spacer and configured to face the interspace when the spacer is mounted between the glazing panes, and a gas-diffusion barrier film formed on the outer side of the spacer which faces away from the interspace when the spacer is mounted between the glazing panes, wherein:

the lateral side walls are configured to respectively face the glazing panes in a width direction (x) that is perpendicular to the longitudinal direction (z) when the spacer is mounted between the glazing panes, the lateral side walls extend, in the cross section (x-y), in a height direction (y) that is perpendicular to the longitudinal direction (z) and the width direction (x), towards the inner side up to respective inner ends of the lateral side walls, lateral outer sides at the inner ends of the lateral side walls are separated by a predetermined distance (w1) in a state in which no external pressure force or no external tensional force is applied to the lateral side walls, the inner wall connects the lateral side walls on the inner side of the spacer, a chamber configured to accommodate desiccating material is defined, in a cross-sectional view perpendicular to the longitudinal direction (z), on respective lateral sides by the lateral side walls and on the side facing the interspace by the inner wall, the inner wall is configured to allow gas exchange between the interspace and the chamber when the spacer is mounted between the glazing panes, the spacer has a predetermined width (w1) in the width direction (x) corresponding to the predetermined distance, and a predetermined height (h1) in the height direction (y), the predetermined width (w1) is a value selected from a range of 10-20 mm, the predetermined height (h1) is a value selected from a range of 6-8 mm, and the inner wall comprises a recess portion having a depth (dr) in the height direction (y) of at least 1.5 mm, a width (w2) in the width direction (x) of at least 2.5 mm and a wall thickness (dt) in a range of 20% to 80% of a wall thickness (diw) of other parts of the inner wall, the recess portion being configured to allow a length of the inner wall to change in the width direction in response to an external pressure force or an external tensional force applied to the side walls in the width direction (x).

2. The spacer according to claim 1, further comprising:

an outer wall defined on the outer side of the spacer and connected to the side walls either directly or by interposed slant wall sections, the gas-diffusion barrier film being disposed on the outer wall.

3. The spacer according to claim 1, wherein:

the spacer has a generally rectangular cross-section (x-y) perpendicular to the longitudinal direction defined, on an outer side facing away from the interspace when the spacer is mounted between the glazing panes, by an outer wall and/or the gas-diffusion barrier film, and defined by the inner wall on the inner side and the two lateral side walls when the spacer is mounted between the glazing panes, and the recess portion is configured to allow the length of the inner wall in the width direction to change in response to an external pressure force or an external tensional force applied to the lateral side walls by elastic deformation of the recess portion while the outer wall and/or the gas-diffusion barrier film have a strength sufficient to hold constant the width (w1) in the width direction (x) of the spacer on the outer side.

4. The spacer according to claim 3, wherein the outer wall is defined on the outer side of the spacer and is connected to the lateral side walls either directly or by interposed slant wall sections.

5. The spacer according to claim 1, wherein the recess portion has, in the cross section (x-y):

a rectangular shape with three side portions formed by the inner wall, an open side facing the interspace when the spacer is mounted between the glazing panes, the depth (dr) of the recess portion in the height direction (y) is up to 50% of the predetermined height (h1) of the spacer and the width (w2) of the recess portion in the width direction (x) is up to 50% of the predetermined width (w1) of the spacer.

6. The spacer according to claim 1, wherein the depth (dr) of the recess portion in the height direction (y) is in a range of 1.5 mm to 2 mm and the width (w2) of the recess portion in the width direction (x) is in a range of 2.5 mm to 4 mm.

7. The spacer according to claim 1, wherein the recess portion has, in the cross section (x-y):

a triangular shape with an apex between two side portions formed by the inner wall, an open side facing the interspace when the spacer is mounted between the glazing panes, the depth (dr) of the recess portion in the height direction (y) is up to 50% of the predetermined height (h1) of the spacer and the width (w2) of the recess portion in the width direction (x) is up to 60% of the predetermined width (w1) of the spacer.

8. The spacer according to claim 7, wherein the depth (dr) of the recess portion in the height direction (y) is in a range of 1.5 mm to 2.5 mm and the width (w2) of the recess portion is in the width direction (x) in a range of 3.5 mm to 5 mm.

9. The spacer according to claim 1, wherein the recess portion has, in the cross section (x-y):

a curved shape with curved portions and a thin portion formed by the inner wall, a concave curvature facing away from the interspace when the spacer is mounted between the glazing panes, the depth (dr) of the recess portion in the height direction (y) is up to 50% of the predetermined height (h1) of the spacer and the width (w2) of the recess portion in the width direction (x) is up to 80% of the predetermined width (w1) of the spacer.

10. The spacer according to claim 9, wherein the depth (dr) of the recess portion in the height direction (y) is in a range of 1.5 mm to 2.5 mm and the width (w2) of the recess portion is in the width direction (x) in a range of 4 mm to 9 mm.

11. The spacer according to claim 1, wherein the recess portion is centred in the inner wall in the width direction (x).

12. The spacer according to claim 1, further comprising: protrusion(s) respectively provided at lateral outer sides in the width direction (x) at each transition between the inner wall and the respective side walls, each of the protrusions protruding in the width direction (x) beyond the respective side wall by a protrusion width (wp) in a range from 0.05 to 0.5 mm.

13. An insulating glazing unit, comprising:

at least two spaced glazing panes, and the spacer according to claim 1, wherein respective edges of the two glazing panes are connected via the spacer mounted at the respective edges to limit the interspace.

14. A window, door or facade element comprising the insulating glazing unit according to claim 13.

15. A spacer for use in manufacturing an insulating glazing unit, the spacer comprising:

a body composed of a polymer and extending in a longitudinal direction (z) with a substantially constant cross-section (x-y), the body including a first wall connecting two side walls to define the shape of a chamber within the body, wherein:

the first wall is gas permeable, a gas-diffusion barrier is continuously formed on the side of the chamber opposite the first wall, the side walls extend in a height direction (y) that is perpendicular to the longitudinal direction (z) and are configured to respectively face glazing panes of the insulating glazing unit in a width direction (x) that is perpendicular to the longitudinal direction (z) and the height direction (y), the spacer has a total width (w1) between 10-20 mm in the width direction (x) and a total height (h1) between 6-8 mm in the height direction (y), a recess is defined in the first wall, the recess having a depth (dr) in the height direction (y) of at least 1.5 mm, and a width (w2) in the width direction (x) of at least 2.5 mm, within an area defining the recess, the first wall has a wall thickness (dt) in a range of 20% to 80% of a wall thickness (diw) of portions of the first wall outside of the recess, and the recess enables a length of the inner wall to change in the width direction (y) in response to application of an external compression force or an external tensile force on at least one of the two side walls in the width direction (x).

16. The spacer according to claim 15, wherein:

the body includes a second wall formed on the side of the chamber opposite the first wall connecting two side walls, the gas-diffusion barrier is also continuously formed on and/or in the second wall and on and/or in at least portions of the two side walls adjacent to the second wall, the second wall and the gas-diffusion barrier film have a strength sufficient to hold constant a length of the second wall in response to the application of the external compression force or the external tensile force on the at least one of the two side walls in the width direction (x), and the width (w2) of the recess encompasses a central point of the first wall in the width direction (x).

17. The spacer according to claim 15, further comprising:

the gas-diffusion barrier film has a strength sufficient to hold constant a length of the gas-diffusion barrier film in response to the application of the external compression force or the external tensile force on the at least one of the two side walls in the width direction (x), and the width (w2) of the recess encompasses a central point of the first wall in the width direction (x).

18. The spacer according to claim 15, wherein the depth (dr) of the recess in the height direction (y) is measured between (i) a straight virtual line that extends along an outer surface of the first wall that faces away from the chamber and connects first and second ends of the first wall where the first wall is respectively connected to the two side walls, and (ii) an outer surface of a deepest surface of the recess that faces away from the chamber.

19. The spacer according to claim 1, wherein the depth (dr) of the recess portion in the height direction (y) is measured between (i) a straight virtual line that extends along an outer surface of the inner wall that faces away from the chamber and connects first and second ends of the inner wall where the inner wall is respectively connected to the two lateral side walls, and (ii) an outer surface of a deepest surface of the recess portion that faces away from the chamber.

20. The spacer according to claim 19, wherein the outer surface of the deepest surface of the recess portion that faces away from the chamber is disposed more inward toward the chamber than inner surfaces of the inner wall that face the chamber and are disposed on opposite lateral sides of the recess portion.

* * * * *